(12) United States Patent
Liu et al.

(10) Patent No.: US 8,479,263 B1
(45) Date of Patent: Jul. 2, 2013

(54) METHOD AND SYSTEM FOR DETECTING CAPTIVE PORTALS

(75) Inventors: Shuzhou Liu, Toronto (CA); Michael A. Varley, Toronto (CA)

(73) Assignee: Symantec Corporation, Mountain View, CA (US)

( * ) Notice: Subject to any disclaimer, the term of this patent is extended or adjusted under 35 U.S.C. 154(b) by 310 days.

(21) Appl. No.: 13/042,089

(22) Filed: Mar. 7, 2011

(51) Int. Cl.
*G06F 7/04* (2006.01)

(52) U.S. Cl.
USPC .................................................. 726/3

(58) Field of Classification Search
USPC .................................................. 726/3
See application file for complete search history.

(56) References Cited

U.S. PATENT DOCUMENTS

2006/0031407 A1* 2/2006 Dispensa et al. ............ 709/219
2008/0186882 A1* 8/2008 Scherzer et al. ............ 370/310

* cited by examiner

Primary Examiner — Jacob Lipman
(74) Attorney, Agent, or Firm — McKay and Hodgson, LLP; Serge J. Hodgson; Sean P. Lewis

(57) ABSTRACT

A method and system for detecting captive portals includes a two phase captive portal detection process whereby an initial HTTP ping request is sent from the endpoint captive portal detection application on an end user computing system to an Internet accessible web server. The Internet accessible web server is expected to return an initial response token to the endpoint captive portal detection application in response to the initial HTTP ping request and if the expected initial response token is received, an initial HTTPS query request is then sent together with the returned initial response token that requires server/client mutual authentication. If mutual authentication is accomplished, then it is determined that the user is not in a captive portal. Follow up HTTP ping requests are then periodically generated by the endpoint captive portal detection application and if the responses to the follow up HTTP ping requests do not change, i.e., the token does not change, no new HTTPS query request is sent.

20 Claims, 4 Drawing Sheets

METHOD AND SYSTEM FOR DETECTING CAPTIVE PORTALS

BACKGROUND OF THE INVENTION

As mobile computing systems have become more and more the common, the number of Wi-Fi enabled devices and Wi-Fi networks has also increased. A Wi-Fi enabled device such as a personal computer, videogame console, smart phone, or digital audio player, can connect to the Internet, or other cloud, when within range of a wireless network. Currently, the coverage of one or more access points, also called "hotspots" can comprise an area as small as a few rooms in a private residence or as large as many square miles. Wi-Fi can provide public access at Wi-Fi hotspots that is free of charge, or by subscription to various commercial services, and/or as provided on a "pay as you" use plan.

One device currently used in connection with Wi-Fi networks is the "captive portal". The captive portal technique forces an HTTP client on a network to a special captive portal webpage, typically not the webpage requested, for authentication and/or payment purposes prior to providing access to the Internet, or other cloud, and the requested webpage. Typically, a captive portal turns a web browser into an authentication device. This is done by intercepting all packets or ports, until the user opens a browser and tries to access the Internet, at which time the browser is redirected to a captive portal webpage which may then require authentication and/or payment information prior to providing access to the desired webpage. In some cases, the browser is redirected to the captive portal webpage in order to force the user to accept, or decline to accept, licensing terms or other terms of use.

Given that captive portals are now so prevalent, and that captive portals redirect browsers to captive portal webpages that require user input and/or authentication, it is often helpful, and sometimes critical, to detect the presence of a captive portal and/or whether a user is "in" or "out" of a captive portal.

For instance, some hosted Web security services, such as the Symantec Hosted Services Web Security system, available from Symantec, Inc., of Mountain View, Calif., use web proxy servers, or other intervening computing systems, to redirect traffic to a security cloud in order to enforce policies and scan contents. However, if a roaming user is in a captive portal, this traffic should not be redirected to the cloud because the cloud does not know how to, and cannot, access the local captive portal webpages and/or provide authentication data. Of course, if the user is out of a captive portal, the traffic should be redirected to the security cloud immediately to secure the desired protection.

In the example above, the hosted web security service is temporarily disabled in the event of a captive portal; consequently, it is highly desirable to have a reliable captive portable detection system in order to enforce web security policies for roaming users. This is particularly true since a false positive result may expose the user to various security risks, while a false negative result may unnecessarily prevent the user from taking advantage of some Wi-Fi hotspots.

Currently, in some instances, an external web server is used as an observer in an attempt to detect captive portals. However, currently, captive portal detection methods typically send out a single HTTP/HTTPS request and the response is then analyzed. However, these currently available single HTTP/HTTPS request methods and systems are often not reliable because, for example, the end user computing system typically assumes a "success" response is from the observer web server, however, it can actually come from captive portal.

In addition, since currently available single HTTP/HTTPS request systems always include an HTTPS component, they are often expensive to implement, in terms of lag time, processor cycles, and other hardware usage, because HTTPS itself is a relatively "heavy", processor intensive, and "expensive", mechanism. In addition, currently available single HTTP/HTTPS systems are often inaccurate because they can only detect either HTTP or HTTPS captive portals, but are unable to detect both HTTP and HTTPS captive portals.

SUMMARY

According to one embodiment, a method and system for detecting captive portals includes a process for detecting captive portals whereby an Internet accessible web server is set up and used as an observer computing system. In one embodiment, an endpoint captive portal detection application is implemented, at least in part, on an end user computing system. In one embodiment, a two phase captive portal detection process is implemented whereby an initial HTTP ping request is sent from the endpoint captive portal detection application on the end user computing system to the Internet accessible web server. In one embodiment, the Internet accessible web server is expected to return an initial response token, i.e., an encrypted user gateway IP, to the endpoint captive portal detection application in response to the initial HTTP ping request. In one embodiment, if the expected initial response token is received by the endpoint captive portal detection application, an initial HTTPS query request is then sent together with the returned initial response token from the endpoint captive portal detection application to the Internet accessible web server. In one embodiment, the initial HTTPS request requires server/client mutual authentication. In one embodiment, if the expected initial response token is returned in response to the initial HTTP ping request and initial HTTPS requested server/client mutual authentication is accomplished, then it is determined that the user is not in a captive portal. On the other hand, in one embodiment, if the expected initial response token is not returned in response to the initial HTTP ping request and/or the initial HTTPS requested server client mutual authentication is not accomplished, then it is determined that the user is likely in a captive portal. In one embodiment, follow up HTTP ping requests are periodically generated by the endpoint captive portal detection application and if the responses to the follow up HTTP ping requests do not change, i.e., the token does not change, then no new HTTPS query request is sent. However, if a responses to a follow up HTTP ping request does change, i.e., the token changes, then a new HTTPS query request is sent. At this point, if, the user is not "in" a captive portal, then the mutual authentication required by the new HTTPS query request will be successful and the end user will again be assumed to be "out" of a captive portal. However, if the user has entered a captive portal, the response to the new HTTP ping request will then have changed from the expected token to a local captive portal webpage. In this case, the mutual authentication required by the new HTTPS query request will fail and the end user will be assumed to be "in" a captive portal.

Using the method and system for detecting captive portals discussed herein, captive portals can be detected in a secure manner by requiring both a token in response a HTTP ping request and HTTPS mutual authentication.

In addition, periodic follow up HTTP ping requests continue to be generated and if the expected response token does not change, no new HTTPS query requests are generated and sent. Consequently, using the method and system for detecting captive portals discussed herein, a minimal number of "expensive" HTTPS query requests are generated.

In addition, using the method and system for detecting captive portals discussed herein, both the HTTP and HTTPS paths are checked. Consequently, using the method and system for detecting captive portal discussed herein, a fast, efficient, reliable, and secure system is provided for detecting captive portals.

Figure 1:
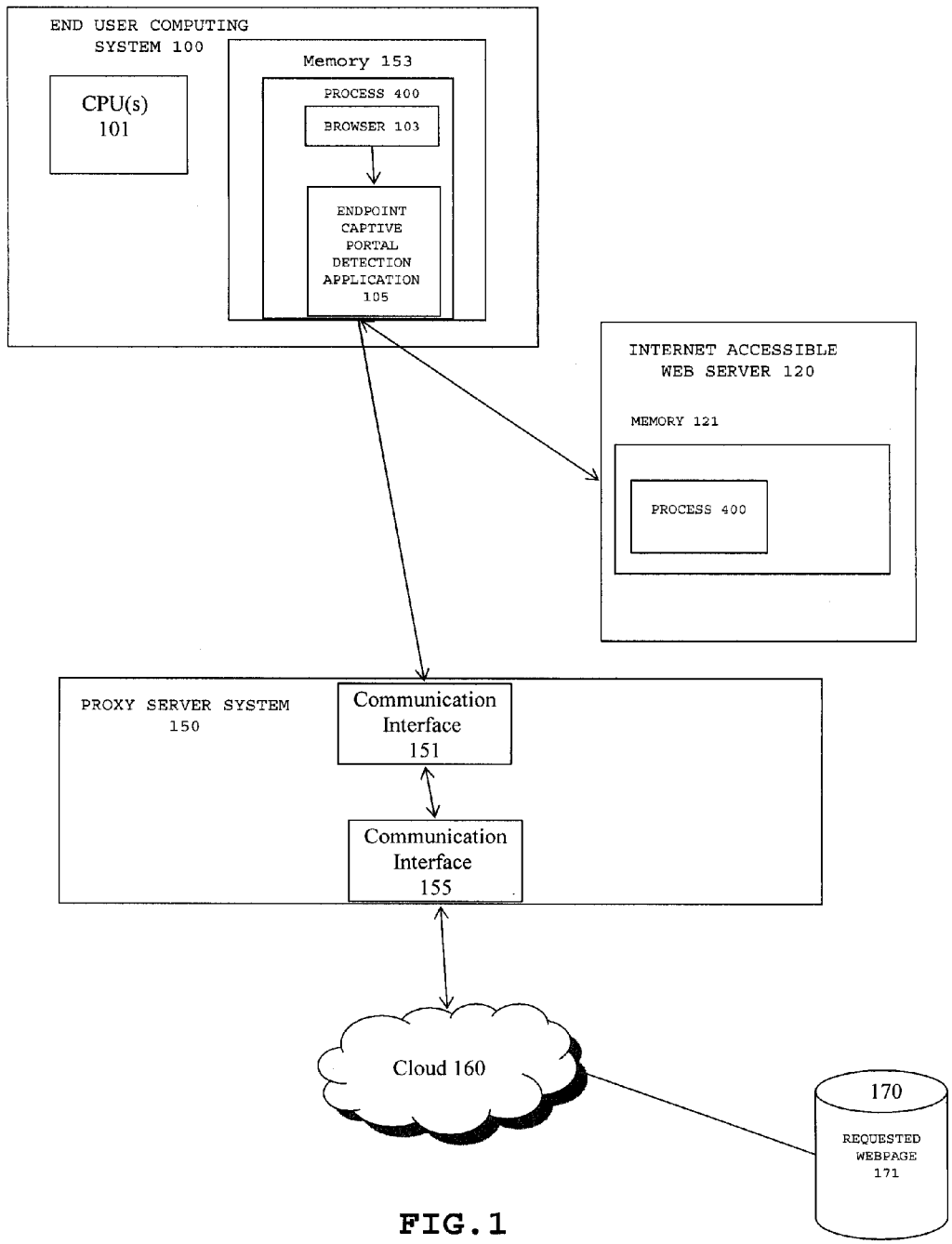
FIG. 1 is a block diagram of an exemplary hardware architecture for implementing one embodiment including an end user computing system, an Internet accessible web server, a proxy server system, a cloud, and a data storage system including a requested webpage and/or webpage data, in accordance with one embodiment.

Common reference numerals are used throughout the FIGS. and the detailed description to indicate like elements. One skilled in the art will readily recognize that the above FIGS. are examples and that other architectures, modes of operation, orders of operation and elements/functions can be provided and implemented without departing from the characteristics and features of the invention, as set forth in the claims.

DETAILED DESCRIPTION

Embodiments will now be discussed with reference to the accompanying FIGS., which depict one or more exemplary embodiments. The following description includes reference to specific embodiments for illustrative purposes. However, the illustrative discussion below is not intended to be exhaustive or to limit the invention to the precise forms disclosed. Many modifications and variations are possible in view of the teachings below. The embodiments discussed below were chosen and described in order to explain the principles of the invention, and its practical applications, to thereby enable others skilled in the art to utilize the invention and various embodiments with various modifications as may be suited to the particular use contemplated. Therefore, embodiments may be embodied in many different forms than those shown and discussed herein and should not be construed as limited to the embodiments set forth herein, shown in the FIGS., and/or described below.

In one embodiment, an Internet accessible web server is set up and used as an observer computing system. In one embodiment, the Internet accessible web server is separate from any proxy server and includes a separate external IP address implemented on a separate computing system. In one embodiment, the Internet accessible web server is set up to receive HTTP ping requests and to return response tokens, such as an encrypted user gateway IP, in response to the HTTP ping requests, and to receive HTTPS query requests that require client/server mutual authentication.

In one embodiment, an endpoint captive portal detection application is installed on an end user computing system.

In one embodiment, the endpoint captive portal detection application is installed on the end user computing system via data download, and/or transfer, and/or the Internet, and/or one or more standard input/output (I/O) devices such as a compact disk (CD), or Digital Video Disc (DVD) drive, floppy disk drive, or other device capable of inputting data to, and outputting data from, a computing system whether available or known at the time of filing, and/or as later developed.

In one embodiment, the endpoint captive portal detection application is a software application installed on the end user computing system as part of a parent software system and/or package.

In one embodiment, the endpoint captive portal detection application is a software application installed on the end user computing system as part of a parent security system and/or package.

In one embodiment, the end user computing system is any computing system as defined herein, and/or as known in the art at the time of filing, and/or as developed thereafter, such as, but not limited to: a portable computing system; a notebook computing system; a tablet computing system; a desktop computing system; a cellular telephone; a smart phone; a digital wireless telephone; a workstation computing system; a Personal Digital Assistant (PDA); a media player, i.e., an MP3 player and/or other music and/or video player; a server computing system; an Internet appliance; or any other device that includes components that can execute all, or part, of any one of the processes and/or operations as described herein, and/or as known in the art at the time of filing, and/or as developed/made available after the time of filing. In addition, as used herein, the term computing system, can denote, but is not limited to, computing systems made up of multiple: computers; wireless devices; cellular telephones; digital telephones; two-way pagers; PDAs; media players; server computers; or any desired combination of these devices, that are coupled to perform the processes and/or operations as described herein.

In one embodiment, the end user computing system includes a web browser and, in one embodiment, the end user points the web browser to the endpoint captive portal detection application using a user interface display, and/or one or more user interface devices such as a keyboard, a mouse, a touchpad, voice recognition system, or any other means, mechanism, process, and/or procedure for converting user actions into computing system instructions.

In one embodiment, once the end user points the web browser to the endpoint captive portal detection application, the end user then requests to access a desired webpage.

In one embodiment, the request to access the desired webpage is forwarded to the endpoint captive portal detection application.

In one embodiment, the endpoint captive portal detection application attempts to determine the initial location of the end user computing system before handling the webpage request by sending an initial HTTP ping request to the Internet accessible web server. As noted above, in one embodiment, the Internet accessible web server is separate from any proxy server and includes a separate external IP address implemented on a separate computing system.

In one embodiment, the Internet accessible web server is expected to respond to the HTTP ping request by returning an initial response token, e.g., an encrypted user gateway IP.

In one embodiment, if the expected initial response token is received from the Internet accessible web server in response to the initial HTTP ping request, the endpoint captive portal detection application sends an initial HTTPS query request to the Internet accessible web server together with the returned initial response token. In one embodiment, the initial HTTPS query request requires server/client mutual authentication.

In one embodiment, the initial HTTPS query request from the endpoint captive portal detection application indicates the status of the end user computing system, for instance, "roaming".

In one embodiment, the initial HTTPS query request response from the Internet accessible web server indicates the closest proxy server and the endpoint captive portal detection application selects the closest proxy server.

In one embodiment, if the expected initial response token is received from the Internet accessible web server, and the initial HTTPS query request server/client mutual authentication is accomplished, then it is determined that the end user is not in a captive portal, i.e., the end user computing system is determined to be "out" of a captive portal and the desired webpage request is then forwarded to a cloud via the selected/ designated proxy server.

In one embodiment, the cloud is a security cloud associated with a hosted web security service. In one embodiment, the security cloud will then enforce security policies and perform any security checks such as virus scanning.

One example of a hosted web security service is the Symantec Hosted Services Web Security system, available from Symantec, Inc., of Mountain View, Calif., that uses web proxy servers, or other intervening computing systems, to redirect traffic to a security cloud in order to enforce security policies and scan contents. As noted above, in one embodiment, the Internet accessible web server is separate from any proxy servers, or other intervening computing systems, and includes a separate external IP address implemented on a separate computing system.

In one embodiment, the endpoint captive portal detection application continues to send out follow up HTTP ping requests periodically and, if the external IP of the end user computing system does not change, i.e., the returned response token does not change, then the end user is still assumed to be "out" of a captive portal and no new HTTPS query requests will be sent; thereby avoiding the "expense" of unnecessary new HTTPS query requests.

On the other hand, if, when the endpoint captive portal detection application sends out a periodic follow up HTTP ping request, the external IP of the end user computing system does change, i.e., the returned response token does change, then a new HTTPS query request will be sent by the endpoint captive portal detection application.

Even if the returned response token changes in response to the endpoint captive portal detection application sending out a periodic follow up HTTP ping request, the end user could still be "out" of a captive portal. Such would be the case if the end user changed locations and/or "hotspots". In this case, the endpoint captive portal detection application would send out a new HTTPS query request requiring server/client mutual authentication. In this case, if the end user is still "out" of a captive portal, the HTTPS query request server/client mutual authentication will still be successful, and a determination will be made that that the user is not in a captive portal.

However, if the end user is now "in" a captive portal, when the endpoint captive portal detection application sends out a periodic follow up HTTP ping request, the external IP of the end user computing system will change, i.e., the returned response token will change, because the HTTP ping request will be redirected to the local captive portal authentication page. Consequently, when the new HTTPS query request is sent by the endpoint captive portal detection application, the mutual authentication required by the new HTTPS query request will not be possible. Consequently, the new HTTPS query request will not be successful and, in one embodiment, the endpoint captive portal detection application will assume the end user is "in" a captive portal and it will not forward the webpage request to the proxy server.

In one embodiment, the endpoint captive portal detection application will continue to send out periodic follow up HTTP ping requests in the background and once the end user is no longer in the captive portal, the HTTP ping request will again result in a changed response token indicating the external IP of the end user computing system has changed. In this case, a new HTTPS query request will again be sent by the endpoint captive portal detection application and, so long as the end user is "out" of a captive portal, the mutual authentication will be successful; the end user will be determined to now be "out" of the captive portal.

Hardware

Figure 4:
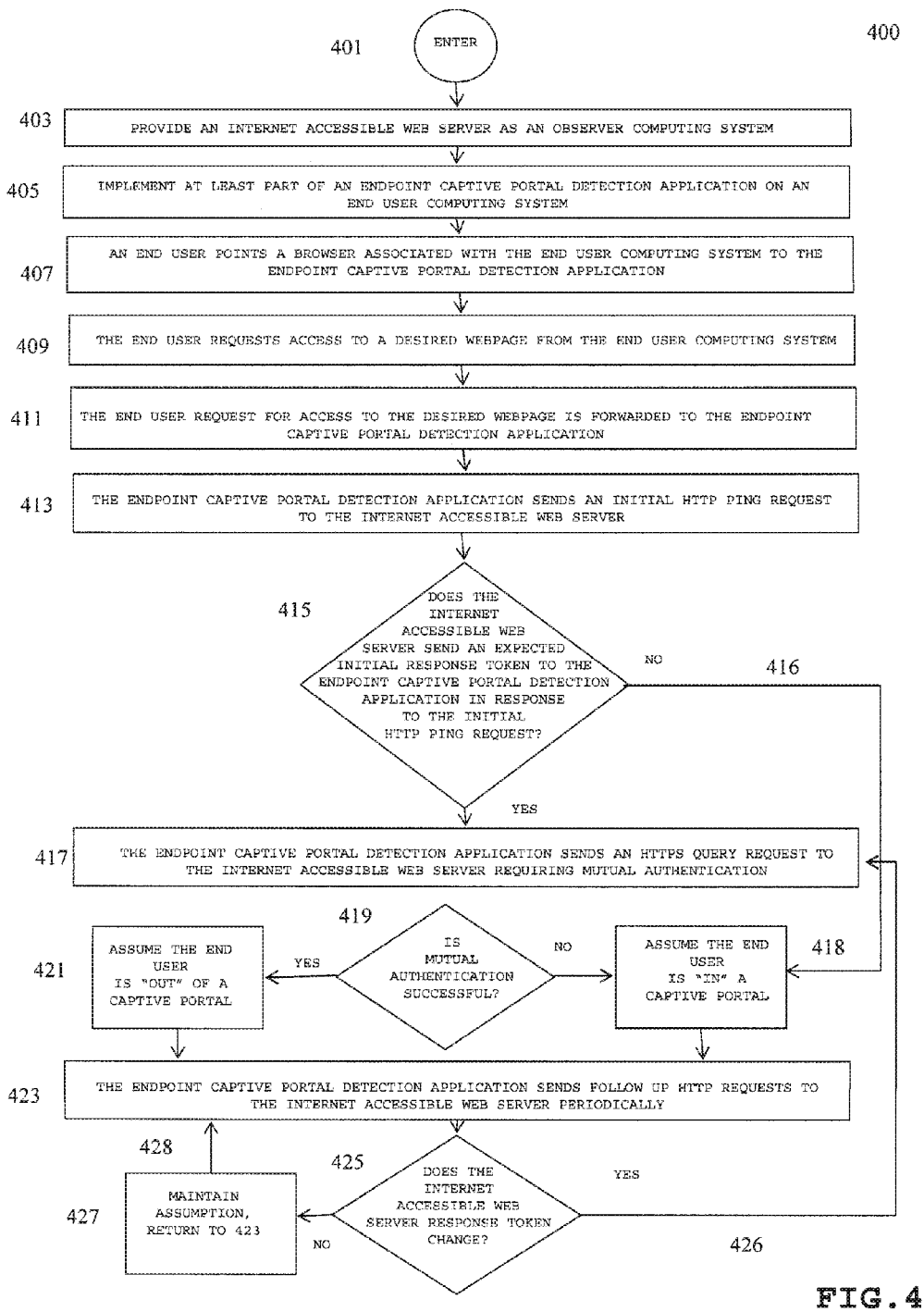
FIG. 4 is a flow chart depicting a process for detecting captive portals in accordance with one embodiment.

FIG. 1 shows a block diagram of an exemplary hardware system 10 suitable for implementing one embodiment of a process for detecting captive portals, such as exemplary process 400 of FIG. 4, discussed below. Returning to FIG. 1, exemplary hardware system 10 includes: end user computing system 100, i.e., a first computing system; Internet accessible web server 120, i.e., a second, or observer, computing system; proxy server system 150, i.e., a third computing system; cloud 160; and data store 170.

In one embodiment, end user computing system 100 is an end-user computing systems used by one or more end-users to connect to Wi-Fi systems and/or request various webpages and websites, or any other end user computing system as discussed herein, and/or as known in the art at the time of filing, and/or as developed after the time of filing.

In one embodiment, end user computing system 100 is a client computing system. In one embodiment, end user computing system 100 is a server computing system that is, in turn, associated with one or more client computing systems. In one embodiment, end user computing system 100 is representative of multiple end user computing systems.

As used herein: the term "computing system", such as is included in the term "end user computing system"; "web server", as included in the term "Internet accessible web server"; and "server system", as included in the term "proxy server system", include, but are not limited to: a portable computer; a workstation; a two-way pager; a cellular telephone; a smart phone; a digital wireless telephone; a Personal Digital Assistant (PDA); a media player, i.e., an MP3 player and/or other music and/or video player; a server computer; an Internet appliance; or any other device that includes components that can execute all, or part, of any one of the processes and/or operations as described herein. In addition, as used herein, the term computing system, can denote, but is not limited to, computing systems made up of multiple: computers; wireless devices; cellular telephones; digital telephones; two-way pagers; PDAs; media players; server computers; or any desired combination of these devices, that are coupled to perform the processes and/or operations as described herein.

In various embodiments, end user computing system 100 can be any computing system as defined herein and/or as known in the art at the time of filing and/or as developed thereafter, that includes components that can execute all, or part, of a process for detecting captive portals in accordance with at least one of the embodiments as described herein.

As shown in FIG. 1, end user computing system 100 includes one or more processors, i.e., CPU(s) 101, and a memory system, memory 153, that includes all or part of procedures, data, and/or instructions associated with a process for detecting captive portals, i.e., process 400. End user computing system 100 also includes a web browser, i.e., browser 103, and an endpoint captive portal detection application, i.e., endpoint captive portal detection application 105.

In one embodiment, endpoint captive portal detection application 105 is installed on end user computing system 100 via data download, and/or transfer, and/or the Internet, and/or one or more standard input/output (I/O) devices (not shown) such as a compact disk (CD), or Digital Video Disc (DVD) drive, floppy disk drive, or other device capable of inputting data to, and outputting data from, a computing system whether available or known at the time of filing, and/or as later developed.

In one embodiment, endpoint captive portal detection application 105 is a software application installed on end user computing system 100 as part of a parent software system and/or package (not shown).

In one embodiment, endpoint captive portal detection application 105 is a software application installed on end user computing system 100 as part of a parent security system and/or package (not shown).

End user computing system 100, memory 153, browser 103, and endpoint captive portal detection application 105 are discussed in more detail below with respect to FIG. 2.

Also seen in FIG. 1 is Internet accessible web server 120. In one embodiment, Internet accessible web server 120 is provided and set up as an observer computing system. In one embodiment, Internet accessible web server 120 is separate from any proxy server and includes a separate external IP address implemented on a separate computing system.

In one embodiment, Internet accessible web server 120 is set up to receive HTTP ping requests and to return response tokens, such as an encrypted user gateway IP, in response to the HTTP ping requests, and to receive HTTPS query requests that require client/server mutual authentication.

As seen in FIG. 1, in one embodiment, Internet accessible web server 120 includes memory 121 that includes all or part of procedures, data, and/or instructions associated with a process for detecting captive portals, i.e., process 400.

In various embodiments, Internet accessible web server 120 is any computing system as defined herein, and/or as known in the art at the time of filing, and/or as developed thereafter, or any desired combination of devices, that are coupled to perform the processes and/or operations as described herein.

Internet accessible web server 120, memory 121, and process 400 are discussed in more detail below with respect to FIG. 3.

Also shown in FIG. 1 is proxy server system 150. In various embodiments, proxy server system 150 is any web proxy computing system; or any other "gateway" computing system as discussed herein, and/or as known in the art at the time of filing, and/or as developed after the time of filing.

As shown in FIG. 1, proxy server system 150 includes communication interface 151, for receiving desired webpage requests from endpoint captive portal detection application 105 of end user computing system 100, and communication interface 155 for connecting to cloud 160.

Also shown in FIG. 1 is cloud 160. In one embodiment, cloud 160 is a public cloud such as the Internet. As shown in FIG. 1, proxy server system 150 is connected to cloud 160 by communication interface 155. In one embodiment, cloud 160 is a private cloud.

As noted above, in some embodiments, cloud 160 is a security cloud associated with a hosted web security service. In one embodiment, cloud 160 enforces security policies and performs any security checks such as virus scanning.

One example of a hosted web security service is the Symantec Hosted Services Web Security system, available from Symantec, Inc., of Mountain View, Calif., that uses web proxy servers, such as proxy server system 150, or other intervening computing systems, to redirect traffic to a security cloud, such as cloud 160, in order to enforce security policies and scan contents. As noted above, in one embodiment, Internet accessible web server 120 is separate from any proxy servers, such as proxy server system 150, or other intervening computing systems, and includes a separate external IP address implemented on a separate computing system.

As also noted above, using hosted web security services, if a roaming user is in a captive portal, this traffic should not be redirected to the security cloud because the security cloud does not know how to, and cannot, access the local captive portal webpages and/or provide authentication data. Of course, if the user is out of a captive portal, the traffic should be redirected to the security cloud immediately to secure the desired protection.

Since, the hosted web security service is temporarily disabled in the event of a captive portal; it is highly desirable to have a reliable captive portable detection system in order to enforce web security policies for roaming users. This is particularly true since a false positive result may expose the user to various security risks, while a false negative result may unnecessarily prevent the user from taking advantage of some Wi-Fi hotspots.

Also shown in FIG. 1 is data store 170. In one embodiment, data store 170 is web page server, and/or any computing system or any other device or mechanism for providing access to a requested desired web page 171.

In various embodiments, data store 170 is a data storage device, a designated server system or computing system, or a designated portion of one or more server systems or computing systems, or a distributed database. In one embodiment, data store 170 is a dedicated mass storage device implemented in hardware, software, or a combination of hardware and software. In one embodiment, data store 170 is a web-based function.

Figure 2:
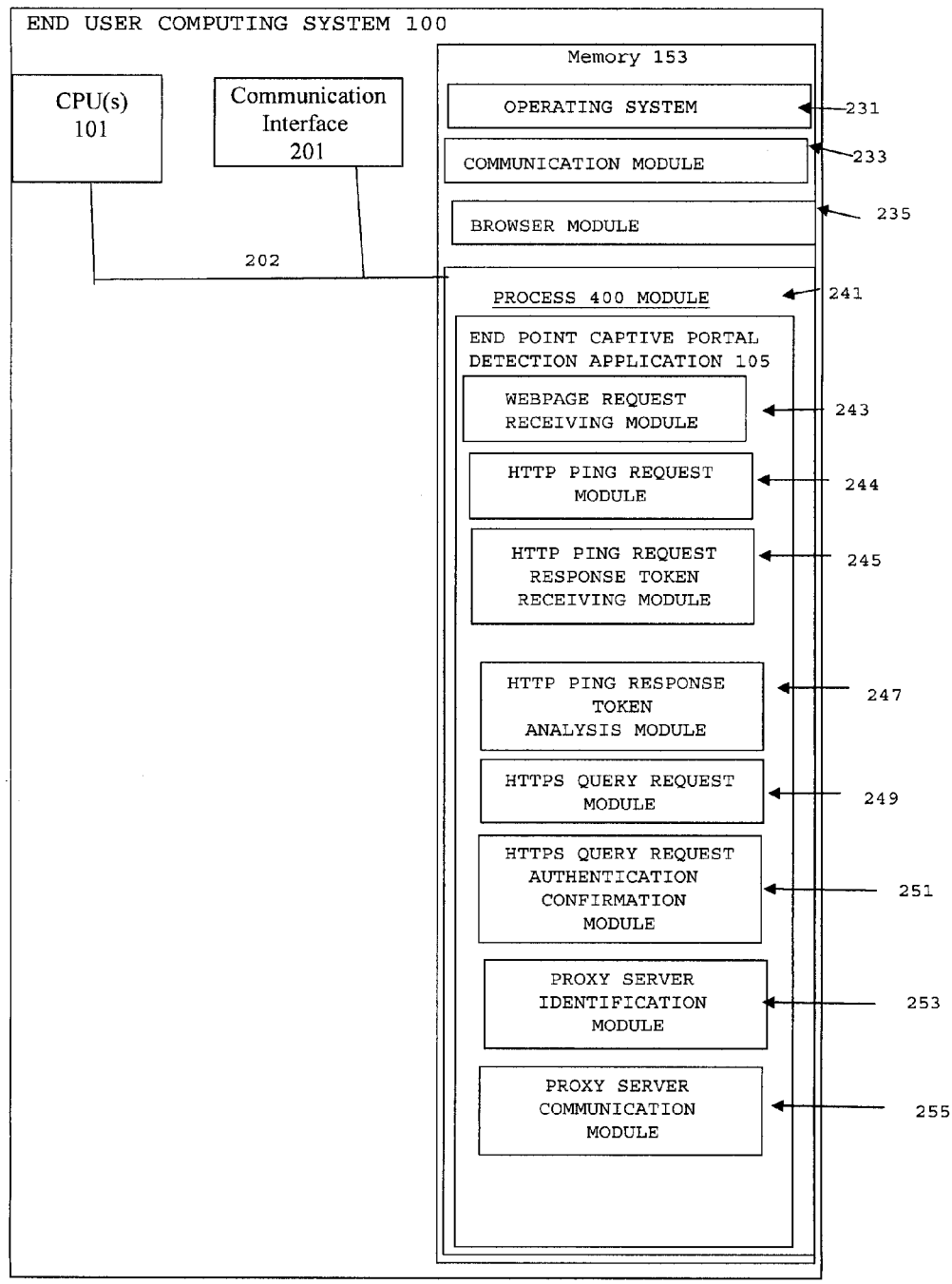
FIG. 2 is a block diagram of the end user computing system of FIG. 1, in accordance with one embodiment.

Referring now to FIGS. 1 and 2 together, FIG. 2 is a more detailed block diagram of end user computing system 100.

As seen in FIG. 2, end user computing system 100 includes CPU(s) 101 coupled to memory 153 and communication interface 210 by bus 202.

As seen in FIG. 2, in one embodiment, memory 153 can store data and/or instructions associated with, but not limited to, the following elements, subsets of elements, and/or supersets of elements for processing by one or more processors, such as CPUs 101: operating system 231 that includes procedures, data, and/or instructions for handling various services and performing/coordinating hardware dependent tasks; communication module 233 that includes procedures, data, and/or instructions for providing, along with communication interface 201, a data transfer capability between end user computing system 100 and Internet accessible web server 120 and/or proxy server system 150; browser module 235 that includes procedures, data, and/or instructions for providing one or more web browsers, and/or a web browser capability; and process 400 module 241 that includes procedures, data, and/or instructions, for implementing at least part of a process for detecting captive portals 400.

As also seen in FIG. 2, in one embodiment, process 400 module 241 of memory 153 includes: end point captive portal detection application 105.

As seen in FIG. 2, end point captive portal detection application 105 includes: webpage request receiving module 243; HTTP ping request module 244; HTTP ping request response token receiving module 245; HTTP ping request response token analysis module 247; HTTPS query request module 249; HTTPS query request authentication confirmation module 251; proxy server identification module 253; and proxy server communication module 255.

In one embodiment, webpage request receiving module 243 includes procedures, data, and/or instructions for receiving requests to access a desired webpage forwarded to the endpoint captive portal detection application 105 from browser 103 and browser module 235.

In one embodiment, HTTP ping request module 244 includes procedures, data, and/or instructions associated with processing and sending initial HTTP ping requests, and/or follow up HTTP ping requests, to Internet accessible web server 120 of FIG. 1.

Returning to FIG. 2, in one embodiment, HTTP ping request response token receiving module 245 includes procedures, data, and/or instructions associated with processing and receiving initial response tokens, and/or follow-up response tokens from Internet accessible web server 120 of FIG. 1 in response to the initial, or follow up, HTTP ping requests of HTTP ping request module 244 (FIG. 2).

In one embodiment, HTTP ping response token analysis module 247 includes procedures, data, and/or instructions associated with analyzing the HTTP ping response tokens of HTTP ping request response token receiving module 245 to ensure they are the expected response tokens having the expected encrypted user gateway IP.

In one embodiment, HTTPS query request module 249 includes procedures, data, and/or instructions for sending an HTTPS query request to Internet accessible web server 120 if the expected response token, or a change in the response token, is received at HTTP ping response token analysis module 247. In one embodiment, the HTTPS query request requires server/client mutual authentication.

In one embodiment, HTTPS query request authentication confirmation module 251 includes procedures, data, and/or instructions for confirming that the mutual server/client mutual authentication of the HTTPS query request of HTTPS query request module 249 is successful.

In one embodiment, proxy server identification module 253 includes procedures, data, and/or instructions for determining from the HTTPS query request response from Internet accessible web server 120 (FIG. 1) the closest proxy server and selecting the closest proxy server.

In one embodiment, proxy server communication module 255 includes procedures, data, and/or instructions for forwarding a desired webpage request to the closest proxy server of proxy server identification module 253.

Those of skill in the art will readily recognize that the choice of components, data, modules, and information shown in FIG. 2, the organization of the components, data, modules, and information shown in FIG. 2, and the manner of storage and location of storage of the data, modules, and information shown in FIG. 2 was made for illustrative purposes only and that other choices of components, data, modules, and information, organization of the components, data, modules, and information, manner of storing, and location of storage, of the data, modules, and information can be implemented without departing from the scope of the invention as set forth in the claims below. In particular, the various modules and/or data shown in FIG. 2 are illustrative only and not limiting. In various other embodiments, the particular modules and/or data shown in FIG. 2 can be grouped together in fewer modules and/or data locations or divided among more modules and/or data locations. Consequently, those of skill in the art will recognize that other orders and/or grouping are possible and the particular modules and/or data, order, and/or grouping shown in FIG. 2 discussed herein do not limit the scope as claimed below.

A more detailed discussion of the operation of end user computing system 100, memory 153, and process 400 module 241 of memory 153 is provided below with respect to FIG. 4.

Figure 3:
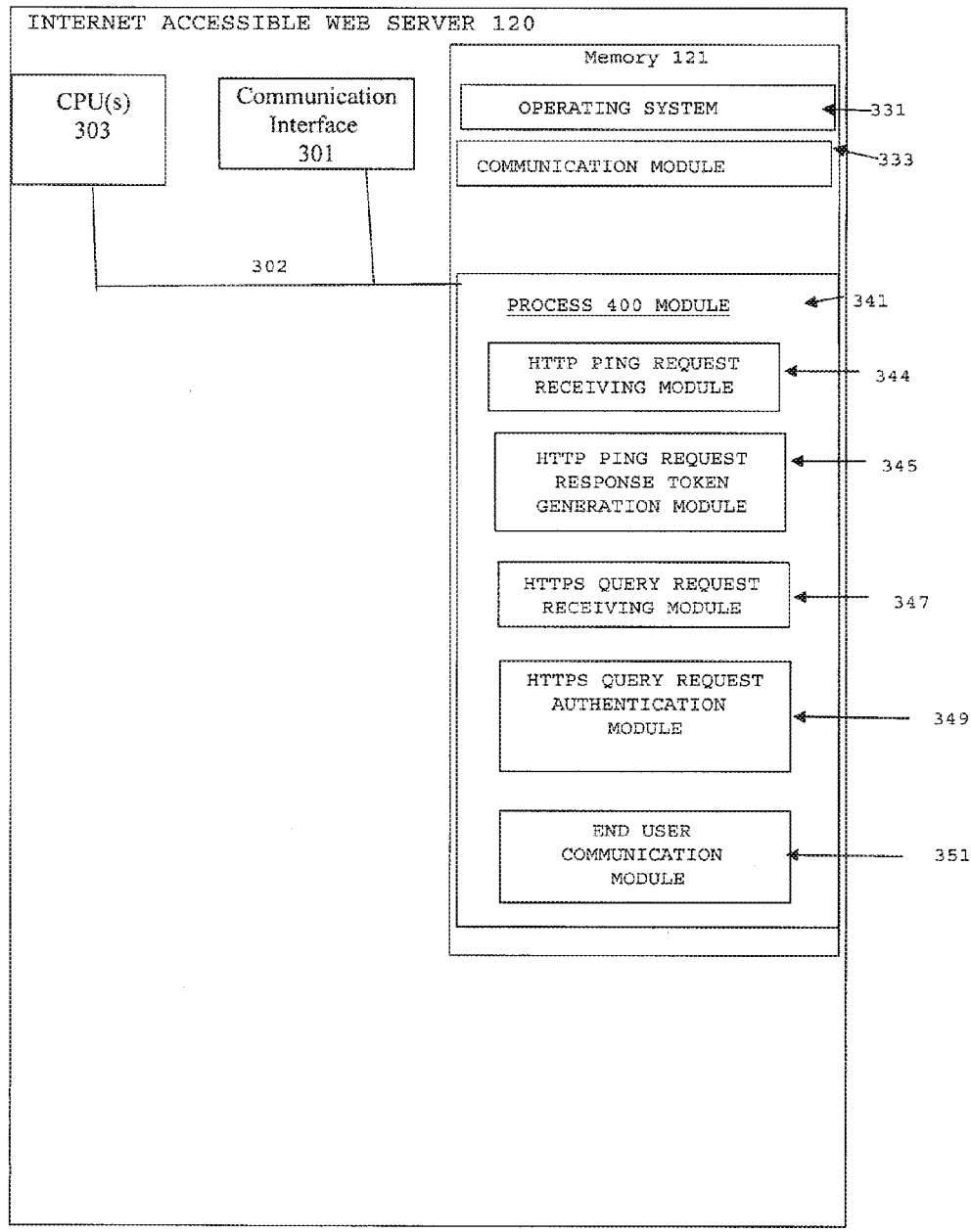
FIG. 3 is a block diagram of the Internet accessible web server of FIG. 1, in accordance with one embodiment.

Referring now to FIGS. 1 and 3 together, FIG. 3 is a more detailed block diagram of Internet accessible web server 120.

As seen in FIG. 3, Internet accessible web server 120 includes CPU(s) 303 coupled to memory 121 and communication interface 301 by bus 302.

As seen in FIG. 3, in one embodiment, memory 121 can store data and/or instructions associated with, but not limited to, the following elements, subsets of elements, and/or supersets of elements, for processing by one or more processors, such as CPUs 101 and 303: operating system 331 that includes procedures, data, and/or instructions for handling various services and performing/coordinating hardware dependent tasks; communication module 333 that includes procedures, data, and/or instructions for providing, along with communication interface 301, a data transfer capability between Internet accessible web server 120 and end user computing system 100; and process 400 module 341 that includes procedures, data, and/or instructions, for implementing at least part of a process for detecting captive portals 400.

As also seen in FIG. 3, in one embodiment, process 400 module 341 of memory 121 includes: HTTP ping request receiving module 344; HTTP ping request response token generation module 345; HTTPS query request receiving module 347; HTTPS query request authentication module 349; and end user communication module 351.

In one embodiment, HTTP ping request receiving module 344 includes procedures, data, and/or instructions for receiving initial HTTP ping requests, and/or follow up HTTP ping requests, from end user computing system 100 of FIG. 1.

Returning to FIG. 3, in one embodiment, HTTP ping request response token generation module 345 includes procedures, data, and/or instructions associated with processing, generating, and sending initial response tokens, and/or follow-up response tokens, to end user computing system 100 of FIG. 1 to in response to the initial, or follow up, HTTP ping requests of HTTP ping request module 244 (FIG. 2).

In one embodiment, HTTPS query request receiving module 347 (FIG. 3) includes procedures, data, and/or instructions associated with receiving an HTTPS query request if the expected response token, or a change in the response token, is received at HTTP ping response token analysis module 247 (FIG. 2).

In one embodiment, HTTPS query request authentication module 349 includes procedures, data, and/or instructions for performing the mutual server/client mutual authentication of the HTTPS query request of HTTPS query request module 249.

In one embodiment, end user communication module 351 includes procedures, data, and/or instructions for communicating with wend user computing system 100.

Those of skill in the art will readily recognize that the choice of components, data, modules, and information shown in FIG. 3, the organization of the components, data, modules, and information shown in FIG. 3, and the manner of storage and location of storage of the data, modules, and information shown in FIG. 3 was made for illustrative purposes only and that other choices of components, data, modules, and information, organization of the components, data, modules, and information, manner of storing, and location of storage, of the data, modules, and information can be implemented without departing from the scope of the invention as set forth in the claims below. In particular, the various modules and/or data shown in FIG. 3 are illustrative only and not limiting. In various other embodiments, the particular modules and/or data shown in FIG. 3 can be grouped together in fewer modules and/or data locations or divided among more modules and/or data locations. Consequently, those of skill in the art will recognize that other orders and/or grouping are possible and the particular modules and/or data, order, and/or grouping shown in FIG. 3 discussed herein do not limit the scope as claimed below.

A more detailed discussion of the operation of Internet accessible web server 120, memory 121, and process 400 module 341 of memory 121 is provided below with respect to FIG. 4.

Process

According to one embodiment, a method and system for detecting captive portals includes a process for detecting captive portals whereby an Internet accessible web server is set up and used as an observer computing system. In one embodiment, an endpoint captive portal detection application is implemented, at least in part, on an end user computing system. In one embodiment, a two phase captive portal detection process is implemented whereby an initial HTTP ping request is sent from the endpoint captive portal detection application on the end user computing system to the Internet accessible web server. In one embodiment, the Internet accessible web server is expected to return an initial response token, i.e., an encrypted user gateway IP, to the endpoint captive portal detection application in response to the initial HTTP ping request. In one embodiment, if the expected initial response token is received by the endpoint captive portal detection application, an initial HTTPS query request is then sent together with the returned initial response token from the endpoint captive portal detection application to the Internet accessible web server. In one embodiment, the initial HTTPS request requires server/client mutual authentication. In one embodiment, if the expected initial response token is returned in response to the initial HTTP ping request and initial HTTPS requested server/client mutual authentication is accomplished, then it is determined that the user is not in a captive portal. On the other hand, in one embodiment, if the expected initial response token is not returned in response to the initial HTTP ping request and/or the initial HTTPS requested server client mutual authentication is not accomplished, then it is determined that the user is likely in a captive portal. In one embodiment, follow up HTTP ping requests are periodically generated by the endpoint captive portal detection application and if the responses to the follow up HTTP ping requests do not change, i.e., the token does not change, then no new HTTPS query request is sent. However, if a responses to a follow up HTTP ping request does change, i.e., the token changes, then a new HTTPS query request is sent. At this point, if, the user is not "in" a captive portal, then the mutual authentication required by the new HTTPS query request will be successful and the end user will again be assumed to be "out" of a captive portal. However, if the user has entered a captive portal, the response to the new HTTP ping request will then have changed from the expected token to a local captive portal webpage. In this case, the mutual authentication required by the new HTTPS query request will fail and the end user will be assumed to be "in" a captive portal Referring to FIGS. 1, 2, 3 and 4, FIG. 4 is a flowchart depicting a process for detecting captive portals 400 in accordance with one embodiment.

Process for detecting captive portals 400 begins at ENTER OPERATION 401 and process flow proceeds to PROVIDE AN INTERNET ACCESSIBLE WEB SERVER AS AN OBSERVER COMPUTING SYSTEM OPERATION 403.

In one embodiment, at PROVIDE AN INTERNET ACCESSIBLE WEB SERVER AS AN OBSERVER COMPUTING SYSTEM OPERATION 403 an Internet accessible web server is set up and used as an observer computing system.

In one embodiment, at PROVIDE AN INTERNET ACCESSIBLE WEB SERVER AS AN OBSERVER COMPUTING SYSTEM OPERATION 403, the Internet accessible web server is separate from any proxy server and includes a separate external IP address implemented on a separate computing system.

In one embodiment, at PROVIDE AN INTERNET ACCESSIBLE WEB SERVER AS AN OBSERVER COMPUTING SYSTEM OPERATION 403 the Internet accessible web server is set up to receive HTTP ping requests and to return response tokens, such as an encrypted user gateway IP, in response to the HTTP ping requests, and to receive HTTPS query requests that require client/server mutual authentication.

In one embodiment, the Internet accessible web server of PROVIDE AN INTERNET ACCESSIBLE WEB SERVER AS AN OBSERVER COMPUTING SYSTEM OPERATION 403 is Internet accessible web server 120 of FIGS. 1 and 3.

Returning to FIG. 4, in various embodiments, the Internet accessible web server of PROVIDE AN INTERNET ACCESSIBLE WEB SERVER AS AN OBSERVER COMPUTING SYSTEM OPERATION 403 is any computing system as defined herein, and/or as known in the art at the time of filing, and/or as developed thereafter, such as, but not limited to: a portable computing system; a notebook computing system; a tablet computing system; a desktop computing system; a cellular telephone; a smart phone; a digital wireless telephone; a workstation computing system; a Personal Digital Assistant (PDA); a media player, i.e., an MP3 player and/or other music and/or video player; a server computing system; an Internet appliance; or any other device that includes components that can execute all, or part, of any one of the processes and/or operations as described herein, and/or as known in the art at the time of filing, and/or as developed/made available after the time of filing. In addition, as used herein, the term computing system, can denote, but is not limited to, computing systems made up of multiple: computers; wireless devices; cellular telephones; digital telephones; two-way pagers; PDAs; media players; server computers; or any desired combination of these devices, that are coupled to perform the processes and/or operations as described herein.

In one embodiment, once an Internet accessible web server is set up and used as an observer computing system at PROVIDE AN INTERNET ACCESSIBLE WEB SERVER AS AN OBSERVER COMPUTING SYSTEM OPERATION 403, process flow proceeds to IMPLEMENT AT LEAST PART OF AN ENDPOINT CAPTIVE PORTAL DETECTION APPLICATION ON AN END USER COMPUTING SYSTEM OPERATION 405.

In one embodiment, at IMPLEMENT AT LEAST PART OF AN ENDPOINT CAPTIVE PORTAL DETECTION APPLICATION ON AN END USER COMPUTING SYSTEM OPERATION 405 an endpoint captive portal detection application is implemented, at least in part, on an end user computing system.

In one embodiment, at IMPLEMENT AT LEAST PART OF AN ENDPOINT CAPTIVE PORTAL DETECTION APPLICATION ON AN END USER COMPUTING SYSTEM OPERATION 405 an endpoint captive portal detection application such as endpoint captive portal detection application 105 of FIGS. 1 and 2 is implemented, at least in part, on an end user computing system, such as end user computing system 100 of FIGS. 1 and 2.

In one embodiment, at IMPLEMENT AT LEAST PART OF AN ENDPOINT CAPTIVE PORTAL DETECTION APPLICATION ON AN END USER COMPUTING SYSTEM OPERATION 405, the endpoint captive portal detection application is installed on the end user computing system via data download, and/or transfer, and/or the Internet, and/or one or more standard input/output (I/O) devices such as a compact disk (CD), or Digital Video Disc (DVD) drive, floppy disk drive, or other device capable of inputting data to, and outputting data from, a computing system whether available or known at the time of filing, and/or as later developed.

In one embodiment, the endpoint captive portal detection application of IMPLEMENT AT LEAST PART OF AN ENDPOINT CAPTIVE PORTAL DETECTION APPLICATION ON AN END USER COMPUTING SYSTEM OPERATION 405 is a software application installed on the end user computing system as part of a parent software system and/or package.

In one embodiment, the endpoint captive portal detection application of IMPLEMENT AT LEAST PART OF AN ENDPOINT CAPTIVE PORTAL DETECTION APPLICATION ON AN END USER COMPUTING SYSTEM OPERATION 405 is a software application installed on the end user computing system as part of a parent security system and/or package.

In one embodiment, the end user computing system of IMPLEMENT AT LEAST PART OF AN ENDPOINT CAPTIVE PORTAL DETECTION APPLICATION ON AN END USER COMPUTING SYSTEM OPERATION 405 is any computing system as defined herein, and/or as known in the art at the time of filing, and/or as developed thereafter, such as, but not limited to: a portable computing system; a notebook computing system; a tablet computing system; a desktop computing system; a cellular telephone; a smart phone; a digital wireless telephone; a workstation computing system; a Personal Digital Assistant (PDA); a media player, i.e., an MP3 player and/or other music and/or video player; a server computing system; an Internet appliance; or any other device that includes components that can execute all, or part, of any one of the processes and/or operations as described herein, and/or as known in the art at the time of filing, and/or as developed/made available after the time of filing. In addition, as used herein, the term computing system, can denote, but is not limited to, computing systems made up of multiple: computers; wireless devices; cellular telephones; digital telephones; two-way pagers; PDAs; media players; server computers; or any desired combination of these devices, that are coupled to perform the processes and/or operations as described herein.

In one embodiment, the end user computing system of IMPLEMENT AT LEAST PART OF AN ENDPOINT CAPTIVE PORTAL DETECTION APPLICATION ON AN END USER COMPUTING SYSTEM OPERATION 405 includes a web browser.

In one embodiment, once an endpoint captive portal detection application is implemented, at least in part, on an end user computing system at IMPLEMENT AT LEAST PART OF AN ENDPOINT CAPTIVE PORTAL DETECTION APPLICATION ON AN END USER COMPUTING SYSTEM OPERATION 405, process flow proceeds to AN END USER POINTS A BROWSER ASSOCIATED WITH THE END USER COMPUTING SYSTEM TO THE ENDPOINT CAPTIVE PORTAL DETECTION APPLICATION OPERATION 407.

In one embodiment, at AN END USER POINTS A BROWSER ASSOCIATED WITH THE END USER COMPUTING SYSTEM TO THE ENDPOINT CAPTIVE PORTAL DETECTION APPLICATION OPERATION 407 an end user of the end user computing system of IMPLEMENT AT LEAST PART OF AN ENDPOINT CAPTIVE PORTAL DETECTION APPLICATION ON AN END USER COMPUTING SYSTEM OPERATION 405 points a web browser to the endpoint captive portal detection application of IMPLEMENT AT LEAST PART OF AN ENDPOINT CAPTIVE PORTAL DETECTION APPLICATION ON AN END USER COMPUTING SYSTEM OPERATION 405.

At noted above, in one embodiment, the end user computing system of IMPLEMENT AT LEAST PART OF AN ENDPOINT CAPTIVE PORTAL DETECTION APPLICATION ON AN END USER COMPUTING SYSTEM OPERATION 405 includes a web browser. In one embodiment, at AN END USER POINTS A BROWSER ASSOCIATED WITH THE END USER COMPUTING SYSTEM TO THE ENDPOINT CAPTIVE PORTAL DETECTION APPLICATION OPERATION 407 the end user points the web browser to the endpoint captive portal detection application using a user interface display, and/or one or more user interface devices such as a keyboard, a mouse, a touchpad, voice recognition systems, or any other means, mechanism, process, and/or procedure for converting user actions into computing system instructions.

In one embodiment, once the end user of the end user computing system of IMPLEMENT AT LEAST PART OF AN ENDPOINT CAPTIVE PORTAL DETECTION APPLICATION ON AN END USER COMPUTING SYSTEM OPERATION 405 points the web browser to the endpoint captive portal detection application of IMPLEMENT AT LEAST PART OF AN ENDPOINT CAPTIVE PORTAL DETECTION APPLICATION ON AN END USER COMPUTING SYSTEM OPERATION 405 at AN END USER POINTS A BROWSER ASSOCIATED WITH THE END USER COMPUTING SYSTEM TO THE ENDPOINT CAPTIVE PORTAL DETECTION APPLICATION OPERATION 407, process flow proceeds to THE END USER REQUESTS ACCESS TO A DESIRED WEBPAGE FROM THE END USER COMPUTING SYSTEM OPERATION 409.

In one embodiment, at THE END USER REQUESTS ACCESS TO A DESIRED WEBPAGE FROM THE END USER COMPUTING SYSTEM OPERATION 409 the end user requests to access a desired webpage.

In one embodiment, at THE END USER REQUESTS ACCESS TO A DESIRED WEBPAGE FROM THE END USER COMPUTING SYSTEM OPERATION 409 once the end user points the web browser to the endpoint captive portal detection application at AN END USER POINTS A BROWSER ASSOCIATED WITH THE END USER COMPUTING SYSTEM TO THE ENDPOINT CAPTIVE PORTAL DETECTION APPLICATION OPERATION 407, the end user then requests to access a desired webpage using a user interface display, and/or one or more user interface devices such as a keyboard, a mouse, a touchpad, voice recognition systems, or any other means, mechanism, process, and/or procedure for converting user actions into computing system instructions.

In one embodiment, once the end user requests to access a desired webpage at THE END USER REQUESTS ACCESS TO A DESIRED WEBPAGE FROM THE END USER COMPUTING SYSTEM OPERATION 409, process flow proceeds to THE END USER REQUEST FOR ACCESS TO THE DESIRED WEBPAGE IS FORWARDED TO THE ENDPOINT CAPTIVE PORTAL DETECTION APPLICATION OPERATION 411.

In one embodiment, at THE END USER REQUEST FOR ACCESS TO THE DESIRED WEBPAGE IS FORWARDED TO THE ENDPOINT CAPTIVE PORTAL DETECTION APPLICATION OPERATION 411 the request to access the desired webpage of THE END USER REQUESTS ACCESS TO A DESIRED WEBPAGE FROM THE END USER COMPUTING SYSTEM OPERATION 409 is forwarded to the endpoint captive portal detection application of IMPLEMENT AT LEAST PART OF AN ENDPOINT CAPTIVE PORTAL DETECTION APPLICATION ON AN END USER COMPUTING SYSTEM OPERATION 405.

In one embodiment, once the request to access the desired webpage of THE END USER REQUESTS ACCESS TO A DESIRED WEBPAGE FROM THE END USER COMPUTING SYSTEM OPERATION 409 is forwarded to the endpoint captive portal detection application of IMPLEMENT AT LEAST PART OF AN ENDPOINT CAPTIVE PORTAL DETECTION APPLICATION ON AN END USER COMPUTING SYSTEM OPERATION 405 at THE END USER REQUEST FOR ACCESS TO THE DESIRED WEBPAGE IS FORWARDED TO THE ENDPOINT CAPTIVE PORTAL DETECTION APPLICATION OPERATION 411, process flow proceeds to THE ENDPOINT CAPTIVE PORTAL DETECTION APPLICATION SENDS AN INITIAL HTTP PING REQUEST TO THE INTERNET ACCESSIBLE WEB SERVER OPERATION 413.

In one embodiment, at THE ENDPOINT CAPTIVE PORTAL DETECTION APPLICATION SENDS AN INITIAL HTTP PING REQUEST TO THE INTERNET ACCESSIBLE WEB SERVER OPERATION 413 the first phase of a two phase captive portal detection process is implemented and an initial HTTP ping request is sent from the endpoint captive portal detection application on the end user computing system of IMPLEMENT AT LEAST PART OF AN ENDPOINT CAPTIVE PORTAL DETECTION APPLICATION ON AN END USER COMPUTING SYSTEM OPERATION 405 to the Internet accessible web server of PROVIDE AN INTERNET ACCESSIBLE WEB SERVER AS AN OBSERVER COMPUTING SYSTEM OPERATION 403.

In one embodiment, at THE ENDPOINT CAPTIVE PORTAL DETECTION APPLICATION SENDS AN INITIAL HTTP PING REQUEST TO THE INTERNET ACCESSIBLE WEB SERVER OPERATION 413 the endpoint captive portal detection application attempts to determine the initial location of the end user computing system before handling the webpage request by sending an initial HTTP ping request to the Internet accessible web server.

As noted above, in one embodiment, the Internet accessible web server is separate from any proxy server and includes a separate external IP address implemented on a separate computing system.

In one embodiment, the Internet accessible web server is expected to respond to the HTTP ping request by returning an initial response token, e.g., an encrypted user gateway IP.

In one embodiment, once the first phase of a two phase captive portal detection process is implemented and an initial HTTP ping request is sent from the endpoint captive portal detection application on the end user computing system of IMPLEMENT AT LEAST PART OF AN ENDPOINT CAPTIVE PORTAL DETECTION APPLICATION ON AN END USER COMPUTING SYSTEM OPERATION 405 to the Internet accessible web server of PROVIDE AN INTERNET ACCESSIBLE WEB SERVER AS AN OBSERVER COMPUTING SYSTEM OPERATION 403 at THE ENDPOINT CAPTIVE PORTAL DETECTION APPLICATION SENDS AN INITIAL HTTP PING REQUEST TO THE INTERNET ACCESSIBLE WEB SERVER OPERATION 413, process flow proceeds to DOES THE INTERNET ACCESSIBLE WEB SERVER SEND AN EXPECTED INITIAL RESPONSE TOKEN TO THE ENDPOINT CAPTIVE PORTAL DETECTION APPLICATION IN RESPONSE TO THE INITIAL HTTP PING REQUEST? OPERATION 415.

In one embodiment, at DOES THE INTERNET ACCESSIBLE WEB SERVER SEND AN EXPECTED INITIAL RESPONSE TOKEN TO THE ENDPOINT CAPTIVE PORTAL DETECTION APPLICATION IN RESPONSE TO THE INITIAL HTTP PING REQUEST? OPERATION 415a a determination is made as to whether the initial HTTP ping request sent from the endpoint captive portal detection application on the end user computing system to the Internet accessible web server at THE ENDPOINT CAPTIVE PORTAL DETECTION APPLICATION SENDS AN INITIAL HTTP PING REQUEST TO THE INTERNET ACCESSIBLE WEB SERVER OPERATION 413 results in the expected initial response token, e.g., an expected encrypted user gateway IP.

In one embodiment, if the expected initial response token is not received from the Internet accessible web server in response to the initial HTTP ping request, at DOES THE INTERNET ACCESSIBLE WEB SERVER SEND AN EXPECTED INITIAL RESPONSE TOKEN TO THE ENDPOINT CAPTIVE PORTAL DETECTION APPLICATION IN RESPONSE TO THE INITIAL HTTP PING REQUEST? OPERATION 415 a "NO" result is returned and path 416 is taken directly to ASSUME THE END USER IS "IN" A CAPTIVE PORTAL OPERATION 418.

In one embodiment, at ASSUME THE END USER IS "IN" A CAPTIVE PORTAL OPERATION 418 an assumption is made that the end user, and the end user computing system, is currently "in" a captive portal.

In one embodiment, if the expected initial response token is received from the Internet accessible web server in response to the initial HTTP ping request, at DOES THE INTERNET ACCESSIBLE WEB SERVER SEND AN EXPECTED INITIAL RESPONSE TOKEN TO THE ENDPOINT CAPTIVE PORTAL DETECTION APPLICATION IN RESPONSE TO THE INITIAL HTTP PING REQUEST? OPERATION 415a a "YES" result is returned and process flow proceeds to THE ENDPOINT CAPTIVE PORTAL DETECTION APPLICATION SENDS AN HTTPS QUERY REQUEST TO THE INTERNET ACCESSIBLE WEB SERVER REQUIRING MUTUAL AUTHENTICATION OPERATION 417.

In one embodiment, at THE ENDPOINT CAPTIVE PORTAL DETECTION APPLICATION SENDS AN HTTPS QUERY REQUEST TO THE INTERNET ACCESSIBLE WEB SERVER REQUIRING MUTUAL AUTHENTICATION OPERATION 417 the second phase of the two phase captive portal detection process is implemented and an initial HTTPS query request is sent, together with the expected returned initial response token from the endpoint captive portal detection application of DOES THE INTERNET ACCESSIBLE WEB SERVER SEND AN EXPECTED INITIAL RESPONSE TOKEN TO THE ENDPOINT CAPTIVE PORTAL DETECTION APPLICATION IN RESPONSE TO THE INITIAL HTTP PING REQUEST? OPERATION 415, to the Internet accessible web server of PROVIDE AN INTERNET ACCESSIBLE WEB SERVER AS AN OBSERVER COMPUTING SYSTEM OPERATION 403.

In one embodiment, at THE ENDPOINT CAPTIVE PORTAL DETECTION APPLICATION SENDS AN HTTPS QUERY REQUEST TO THE INTERNET ACCESSIBLE WEB SERVER REQUIRING MUTUAL AUTHENTICA- TION OPERATION 417 the initial HTTPS query request sent to the Internet accessible web server requires server/client mutual authentication.

In one embodiment, the initial HTTPS query request from the endpoint captive portal detection application of THE ENDPOINT CAPTIVE PORTAL DETECTION APPLICATION SENDS AN HTTPS QUERY REQUEST TO THE INTERNET ACCESSIBLE WEB SERVER REQUIRING MUTUAL AUTHENTICATION OPERATION 417 indicates the status of the end user computing system, for instance, "roaming".

In one embodiment, once the second phase of the two phase captive portal detection process is implemented and an initial HTTPS query request is sent, together with the expected returned initial response token from the endpoint captive portal detection application of DOES THE INTERNET ACCESSIBLE WEB SERVER SEND AN EXPECTED INITIAL RESPONSE TOKEN TO THE ENDPOINT CAPTIVE PORTAL DETECTION APPLICATION IN RESPONSE TO THE INITIAL HTTP PING REQUEST? OPERATION 415, to the Internet accessible web server at THE ENDPOINT CAPTIVE PORTAL DETECTION APPLICATION SENDS AN HTTPS QUERY REQUEST TO THE INTERNET ACCESSIBLE WEB SERVER REQUIRING MUTUAL AUTHENTICATION OPERATION 417, process flow proceeds to IS MUTUAL AUTHENTICATION SUCCESSFUL? OPERATION 419.

In one embodiment, at IS MUTUAL AUTHENTICATION SUCCESSFUL? OPERATION 419 a determination is made as to whether the initial HTTPS requested server/client mutual authentication is accomplished/successful.

In one embodiment, if it is determined at IS MUTUAL AUTHENTICATION SUCCESSFUL? OPERATION 419 that the initial HTTPS requested server/client mutual authentication is not accomplished/not successful, then the result returned at IS MUTUAL AUTHENTICATION SUCCESSFUL? OPERATION 419 is "NO" and process flow proceeds to ASSUME THE END USER IS "IN" A CAPTIVE PORTAL OPERATION 418.

In one embodiment, at ASSUME THE END USER IS "IN" A CAPTIVE PORTAL OPERATION 418 an assumption is made that the end user, and the end user computing system, is currently "in" a captive portal.

In one embodiment, if it is determined at IS MUTUAL AUTHENTICATION SUCCESSFUL? OPERATION 419 that the initial HTTPS requested server/client mutual authentication is accomplished/successful, then the result returned at IS MUTUAL AUTHENTICATION SUCCESSFUL? OPERATION 419 is "YES" and process flow proceeds to ASSUME THE END USER IS "OUT" OF A CAPTIVE PORTAL OPERATION 421.

In one embodiment, at ASSUME THE END USER IS "OUT" OF A CAPTIVE PORTAL OPERATION 421 an assumption is made that the end user, and end user computing system, is currently "out" of a captive portal, i.e., not in a captive portal.

In one embodiment, at ASSUME THE END USER IS "OUT" OF A CAPTIVE PORTAL OPERATION 421 the assumption is made that the end user, and end user computing system, is currently "out" of a captive portal, i.e., not in a captive portal, because if the end user were "in" a captive portal, the initial HTTPS requested server/client mutual authentication could not be accomplished because the HTTPS request will attempt mutual authentication with a local captive portal webpage. Consequently, only if the expected initial response token is returned in response to the initial HTTP ping request and the initial HTTPS requested server/client mutual authentication is accomplished, is an assumption is made at ASSUME THE END USER IS "OUT" OF A CAPTIVE PORTAL OPERATION 421 that the end user, and the end user computing system, is currently "out" of a captive portal.

In one embodiment, the initial HTTPS query request response from the Internet accessible web server indicates the closest proxy server and the endpoint captive portal detection application selects the closest proxy server.

In one embodiment, if the expected initial response token is received from the Internet accessible web server, and the initial HTTPS query request server/client mutual authentication is accomplished, and it is determined at ASSUME THE END USER IS "OUT" OF A CAPTIVE PORTAL OPERATION 421 that the end user is not in a captive portal, i.e., the end user computing system is determined to be "out" of a captive portal, then at ASSUME THE END USER IS "OUT" OF A CAPTIVE PORTAL OPERATION 421 the desired webpage request of THE END USER REQUESTS ACCESS TO A DESIRED WEBPAGE FROM THE END USER COMPUTING SYSTEM OPERATION 409 is forwarded to a cloud via the selected/designated proxy server.

As noted above, in one embodiment, the cloud is a security cloud associated with a hosted web security service. In one embodiment, the security cloud will then enforce security policies and perform any security checks such as virus scanning.

One example of a hosted web security service is the Symantec Hosted Services Web Security system, available from Symantec, Inc., of Mountain View, Calif., that uses web proxy servers, or other intervening computing systems, to redirect traffic to a security cloud in order to enforce security policies and scan contents. As noted above, in one embodiment, the Internet accessible web server is separate from any proxy servers, or other intervening computing systems, and includes a separate external IP address implemented on a separate computing system.

In one embodiment, process flow proceeds from both ASSUME THE END USER IS "IN" A CAPTIVE PORTAL OPERATION 418 and ASSUME THE END USER IS "OUT" OF A CAPTIVE PORTAL OPERATION 421 to THE ENDPOINT CAPTIVE PORTAL DETECTION APPLICATION SENDS FOLLOW UP HTTP REQUESTS TO THE INTERNET ACCESSIBLE WEB SERVER PERIODICALLY OPERATION 423.

In one embodiment, at THE ENDPOINT CAPTIVE PORTAL DETECTION APPLICATION SENDS FOLLOW UP HTTP REQUESTS TO THE INTERNET ACCESSIBLE WEB SERVER PERIODICALLY OPERATION 423, once an initial determination is made as to whether the end user, and the end user computing system, is initially "in" or "out" of a captive portal, follow up HTTP ping requests are periodically generated by the endpoint captive portal detection application of IMPLEMENT AT LEAST PART OF AN ENDPOINT CAPTIVE PORTAL DETECTION APPLICATION ON AN END USER COMPUTING SYSTEM OPERATION 405 and sent to the Internet accessible web server of PROVIDE AN INTERNET ACCESSIBLE WEB SERVER AS AN OBSERVER COMPUTING SYSTEM OPERATION 403.

In one embodiment, the responses to the follow up HTTP ping requests of THE ENDPOINT CAPTIVE PORTAL DETECTION APPLICATION SENDS FOLLOW UP HTTP REQUESTS TO THE INTERNET ACCESSIBLE WEB SERVER PERIODICALLY OPERATION 423 are analyzed at DOES THE INTERNET ACCESSIBLE WEB SERVER RESPONSE TOKEN CHANGE? OPERATION 425 and a determination is made as to whether the response tokens from Internet accessible web server change, i.e., the encrypted gateway IP changes from one response token to the next.

In one embodiment, if at DOES THE INTERNET ACCESSIBLE WEB SERVER RESPONSE TOKEN CHANGE? OPERATION 425 a determination is made that the external IP of the end user computing system does not change, i.e., the returned response token does not change, then a result of "NO" is obtained and the end user is still assumed to be either "in" or "out" of a captive portal, i.e., in the same state, and process flow proceeds to/is maintained at MAINTAIN ASSUMPTION, RETURN TO 423 and returned to THE ENDPOINT CAPTIVE PORTAL DETECTION APPLICATION SENDS FOLLOW UP HTTP REQUESTS TO THE INTERNET ACCESSIBLE WEB SERVER PERIODICALLY OPERATION 423 until a response token does change.

In one embodiment, if at DOES THE INTERNET ACCESSIBLE WEB SERVER RESPONSE TOKEN CHANGE? OPERATION 425 a determination is made that the external IP of the end user computing system does not change, i.e., the returned response token does not change, then no new HTTPS query requests will be sent; thereby avoiding the "expense" of unnecessary new HTTPS query requests.

In one embodiment, if at DOES THE INTERNET ACCESSIBLE WEB SERVER RESPONSE TOKEN CHANGE? OPERATION 425 a determination is made that the external IP of the end user computing system does change, i.e., the returned response token does change, then a result of "YES" is obtained and process flow proceeds along path 426 back to THE ENDPOINT CAPTIVE PORTAL DETECTION APPLICATION SENDS AN HTTPS QUERY REQUEST TO THE INTERNET ACCESSIBLE WEB SERVER REQUIRING MUTUAL AUTHENTICATION OPERATION 417 where a new HTTPS query request will be sent by the endpoint captive portal detection application and process for detecting captive portals 400 is repeated from THE ENDPOINT CAPTIVE PORTAL DETECTION APPLICATION SENDS AN HTTPS QUERY REQUEST TO THE INTERNET ACCESSIBLE WEB SERVER REQUIRING MUTUAL AUTHENTICATION OPERATION 417 on.

In various embodiments, and instances, even if it is determined that the returned response token changes in response to the endpoint captive portal detection application sending out a periodic follow up HTTP ping request at DOES THE INTERNET ACCESSIBLE WEB SERVER RESPONSE TOKEN CHANGE? OPERATION 425, the end user could still be "out" of a captive portal. Such would be the case if the end user changed locations and/or "hotspots".

In this case, the endpoint captive portal detection application would send out a new HTTPS query request requiring server/client mutual authentication at THE ENDPOINT CAPTIVE PORTAL DETECTION APPLICATION SENDS AN HTTPS QUERY REQUEST TO THE INTERNET ACCESSIBLE WEB SERVER REQUIRING MUTUAL AUTHENTICATION OPERATION 417. Then, if the end user is still "out" of a captive portal, the HTTPS query request server/client mutual authentication should still be successful at IS MUTUAL AUTHENTICATION SUCCESSFUL? OPERATION 419 and a determination would be made that that the user is not in a captive portal at ASSUME THE END USER IS "OUT" OF A CAPTIVE PORTAL OPERATION 421.

However, if the end user is now "in" a captive portal, when the endpoint captive portal detection application sends out a periodic follow up HTTP ping request at THE ENDPOINT CAPTIVE PORTAL DETECTION APPLICATION SENDS FOLLOW UP HTTP REQUESTS TO THE INTERNET ACCESSIBLE WEB SERVER PERIODICALLY OPERATION 423, the external IP of the end user computing system will change, i.e., the returned response token will change, because the HTTP ping request will be redirected to the local captive portal authentication page and at DOES THE INTERNET ACCESSIBLE WEB SERVER RESPONSE TOKEN CHANGE? OPERATION 425 this change will be noted and process for detecting captive portals 400 will follow path 426 back to THE ENDPOINT CAPTIVE PORTAL DETECTION APPLICATION SENDS AN HTTPS QUERY REQUEST TO THE INTERNET ACCESSIBLE WEB SERVER REQUIRING MUTUAL AUTHENTICATION OPERATION 417. Then, when the new HTTPS query request is sent by the endpoint captive portal detection application at THE ENDPOINT CAPTIVE PORTAL DETECTION APPLICATION SENDS AN HTTPS QUERY REQUEST TO THE INTERNET ACCESSIBLE WEB SERVER REQUIRING MUTUAL AUTHENTICATION OPERATION 417, the mutual authentication required by the new HTTPS query request will not be possible. Consequently, the new HTTPS query request will not be successful and, in one embodiment, at IS MUTUAL AUTHENTICATION SUCCESSFUL? OPERATION 419 process will proceed to ASSUME THE END USER IS "IN" A CAPTIVE PORTAL OPERATION 418 and endpoint captive portal detection application 400 will assume the end user is "in" a captive portal and will not forward the webpage request of THE END USER REQUESTS ACCESS TO A DESIRED WEBPAGE FROM THE END USER COMPUTING SYSTEM OPERATION 409 to the proxy server.

In one embodiment, the endpoint captive portal detection application will continue to send out periodic follow up HTTP ping requests at THE ENDPOINT CAPTIVE PORTAL DETECTION APPLICATION SENDS FOLLOW UP HTTP REQUESTS TO THE INTERNET ACCESSIBLE WEB SERVER PERIODICALLY OPERATION 423 in the background and once the end user is no longer in the captive portal, the HTTP ping request will again result in a changed response token indicating the external IP of the end user computing system has changed. In this case, a new HTTPS query request will again be sent by the endpoint captive portal detection application and, so long as the end user is "out" of a captive portal, the mutual authentication will be successful, the end user will be determined to now be "out" of the captive portal, the closest proxy server will be provided in the HTTPS request response from the Internet accessible web server, and the webpage request will be forwarded to the cloud via the selected proxy server.

Using process for detecting captive portals 400, captive portals can be detected in a secure manner by requiring both a token in response a HTTP ping request and HTTPS mutual authentication.

In addition, periodic follow up HTTP ping requests continue to be generated and if the expected response token does not change, no new HTTPS query requests are generated and sent. Consequently, using process for detecting captive portals 400, a minimal number of "expensive" HTTPS query requests are generated.

In addition, using process for detecting captive portals 400, both the HTTP and HTTPS paths are checked. Consequently, using process for detecting captive portals 400, a fast, efficient, reliable, and secure system is provided for detecting captive portals.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

Herein, embodiments have been discussed with reference to the accompanying FIGS., which depict one or more exemplary embodiments. The above description includes reference to specific embodiments for illustrative purposes. However, the illustrative discussion above is not intended to be exhaustive or to limit the invention to the precise forms disclosed. Many modifications and variations are possible in view of the teachings below. The embodiments discussed above were chosen and described in order to explain the principles of the invention, and its practical applications, to thereby enable others skilled in the art to utilize the invention and various embodiments with various modifications as may be suited to the particular use contemplated. Therefore, embodiments may be embodied in many different forms than those shown and discussed herein and should not be construed as limited to the embodiments set forth herein, shown in the FIGS., and/or described below. In addition, the nomenclature used for components, capitalization of component designations and terms, the attributes, data structures, or any other programming or structural aspect is not significant, mandatory, or limiting, and the mechanisms that implement the invention or its features can have various different names, formats, and/or protocols. Further, the system and/or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic and/or algorithm-like descriptions and representations are the means used by those of skill in the art to most effectively and efficiently convey the substance of their work to others of skill in the art. These operations, while described functionally or logically, are understood to be implemented by computer programs and/or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as "analyzing", "accessing", "calculating", "capturing", "classifying", "comparing", "defining", "detecting", "determining", "distributing", "encrypting", "extracting", "filtering", "generating", "implementing", "monitoring", "obtaining", "processing", "providing", "receiving", "requesting", "saving", "sending", "storing", "transferring", "transforming", "using", etc., refer to the action and processes of a computing system or similar electronic device that manipulates and operates on data represented as physical (electronic) quantities within the computing system memories, resisters, caches or other information storage, transmission or display devices.

Certain aspects of the present invention include process steps or operations and instructions described herein in an algorithmic and/or algorithmic-like form. It should be noted that the process steps and/or operations and instructions of the present invention can be embodied in software, firmware, and/or hardware, and when embodied in software, can be downloaded to reside on and be operated from different platforms used by real time network operating systems.

The present invention also relates to an apparatus or system for performing the operations described herein. This apparatus or system may be specifically constructed for the required purposes, or the apparatus or system can comprise a general purpose system selectively activated or by a computer program stored on a computer program product as defined herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicably coupled to similar and/or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIGS. are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A system for detecting captive portals comprising:
an end user computing system, the end user computing system including a web browser;

an endpoint captive portal detection application implemented, at least in part, on the end user computing system;

an Internet accessible web server, the Internet accessible web server being operatively coupled to the end user computing system and the endpoint captive portal detection application; and at least one processor associated with the end user computing system, the at least one processor associated with the end user computing system executing at least part of a process for detecting captive portals, the process for detecting captive portals comprising:

an end user pointing the web browser on the end user computing system to the endpoint captive portal detection application using a user interface device;

the end user requesting access to a desired webpage through the web browser on the end user computing system using a user interface device;

forwarding the request for access to the desired webpage to the endpoint captive portal detection application;

the endpoint captive portal detection application sending an initial HTTP ping request to the Internet accessible web server;

determining if the Internet accessible web server sends an expected initial response token back to the endpoint captive portal detection application in response to the initial HTTP ping request;

if the Internet accessible web server does not send an expected initial response token back to the endpoint captive portal detection application in response to the initial HTTP ping request, transforming a status of the end user computing system to the status of assumed "in" captive portal;

if the Internet accessible web server sends an expected initial response token back to the endpoint captive portal detection application in response to the initial HTTP ping request, the endpoint captive portal detection application sending an initial HTTPS query request and the initial response token to the Internet accessible web server, the initial HTTPS query request requiring client/server mutual authentication;

determining if the required client/server mutual authentication is successful;

if the required client/server mutual authentication is not successful, transforming a status of the end user computing system to the status of assumed "in" captive portal; and if the required client/server mutual authentication is successful, transforming a status of the end user computing system to the status of assumed "out" of captive portal.

2. The system for detecting captive portals of claim 1, further comprising:

after transforming a status of the end user computing system to either the status of assumed "out" of captive portal or the status of assumed "in" captive portal:

the endpoint captive portal detection application periodically sending follow up HTTP ping requests to the Internet accessible web server; and if the Internet accessible web server sends a response token back to the endpoint captive portal detection application in response to a follow up HTTP ping request that is unchanged, maintaining the status of the end user computing system as either the status of assumed "out" of captive portal or the status of assumed "in" captive portal without sending an additional HTTPS query request.

3. The system for detecting captive portals of claim 1, further comprising:

after transforming a status of the end user computing system to either the status of assumed "out" of captive portal or the status of assumed "in" captive portal:

the endpoint captive portal detection application periodically sending follow up HTTP ping requests to the Internet accessible web server; and if the Internet accessible web server sends a response token back to the endpoint captive portal detection application in response to a follow up HTTP ping request that is changed:

the endpoint captive portal detection application sending a new HTTPS query request to the Internet accessible web server, the new HTTPS query request requiring client/server mutual authentication;

determining if the required client/server mutual authentication is successful;

if the required client/server mutual authentication is not successful, transforming a status of the end user computing system to the status of assumed "in" captive portal; and if the required client/server mutual authentication is successful, transforming a status of the end user computing system to the status of assumed "out" of captive portal.

4. The system for detecting captive portals of claim 1, wherein:

the response token is an encrypted gateway IP.

5. The system for detecting captive portals of claim 1, wherein:

if the required client/server mutual authentication is successful, and a status of the end user computing system is transformed to the status of assumed "out" of captive portal, sending the request for the desired webpage to a proxy server system and a cloud.

6. The system for detecting captive portals of claim 5, wherein:

the cloud is a private cloud.

7. The system for detecting captive portals of claim 4, wherein:

the cloud is a security cloud.

8. A computing system implemented process for detecting captive portals comprising:

using one or more processors to implement, at least in part, an endpoint captive portal detection application on an end user computing system;

an end user pointing a web browser on the end user computing system to the endpoint captive portal detection application using a user interface device;

the end user requesting access to a desired webpage through the web browser on the end user computing system using a user interface device;

using one or more processors to forward the request for access to the desired webpage to the endpoint captive portal detection application;

using one or more processors to send an initial HTTP ping request from the endpoint captive portal detection application to the Internet accessible web server;

using one or more processors to determine if the Internet accessible web server sends an expected initial response token back to the endpoint captive portal detection application in response to the initial HTTP ping request;

if the Internet accessible web server does not send an expected initial response token back to the endpoint captive portal detection application in response to the initial HTTP ping request, using one or more processors to transform a status of the end user computing system to the status of assumed "in" captive portal;

if the Internet accessible web server sends an expected initial response token back to the endpoint captive portal detection application in response to the initial HTTP ping request, using one or more processors to send an initial HTTPS query request and the initial response token from the endpoint captive portal detection application to the Internet accessible web server, the initial HTTPS query request requiring client/server mutual authentication;

using one or more processors to determine if the required client/server mutual authentication is successful;

if the required client/server mutual authentication is not successful, using one or more processors to transform a status of the end user computing system to the status of assumed "in" captive portal; and if the required client/server mutual authentication is successful, using one or more processors to transform a status of the end user computing system to the status of assumed "out" of captive portal.

9. The computing system implemented process for detecting captive portals of claim 8, further comprising:

after transforming a status of the end user computing system to either the status of assumed "out" of captive portal or the status of assumed "in" captive portal:

using one or more processors to periodically send follow up HTTP ping requests from the endpoint captive portal detection application to the Internet accessible web server; and if the Internet accessible web server sends a response token back to the endpoint captive portal detection application in response to a follow up HTTP ping request that is unchanged, using one or more processors to maintain the status of the end user computing system as either the status of assumed "out" of captive portal or the status of assumed "in" captive portal without sending an additional HTTPS query request.

10. The computing system implemented process for detecting captive portals of claim 8, further comprising:

after transforming a status of the end user computing system to either the status of assumed "out" of captive portal or the status of assumed "in" captive portal:

using one or more processors to periodically send follow up HTTP ping requests from the endpoint captive portal detection application to the Internet accessible web server; and if the Internet accessible web server sends a response token back to the endpoint captive portal detection application in response to a follow up HTTP ping request that is changed:

using one or more processors to send a new HTTPS query request from the endpoint captive portal detection application to the Internet accessible web server, the new HTTPS query request requiring client/server mutual authentication;

using one or more processors to determine if the required client/server mutual authentication is successful;

if the required client/server mutual authentication is not successful, using one or more processors to transform a status of the end user computing system to the status of assumed "in" captive portal; and if the required client/server mutual authentication is successful, using one or more processors to transform a status of the end user computing system to the status of assumed "out" of captive portal.

11. The computing system implemented process for detecting captive portals of claim 8, wherein:

the response token is an encrypted gateway IP.

12. The computing system implemented process for detecting captive portals of claim 8, wherein:

if the required client/server mutual authentication is successful, and a status of the end user computing system is transformed to the status of assumed "out" of captive portal, using one or more processors to send the request for the desired webpage to a proxy server system and a cloud.

13. The computing system implemented process for detecting captive portals of claim 12, wherein:

the cloud is a private cloud.

14. The computing system implemented process for detecting captive portals of claim 12, wherein:

the cloud is a security cloud.

15. A method for detecting captive portals comprising:

implementing an endpoint captive portal detection application on an end user computing system;

an end user pointing a web browser on the end user computing system to the endpoint captive portal detection application using a user interface device;

the end user requesting access to a desired webpage through the web browser on the end user computing system using a user interface device;

forwarding the request for access to the desired webpage to the endpoint captive portal detection application;

the endpoint captive portal detection application sending an initial HTTP ping request to an Internet accessible web server;

determining if the Internet accessible web server sends an expected initial response token back to the endpoint captive portal detection application in response to the initial HTTP ping request;

if the Internet accessible web server does not send an expected initial response token back to the endpoint captive portal detection application in response to the initial HTTP ping request, transforming a status of the end user computing system to the status of assumed "in" captive portal;

if the Internet accessible web server sends an expected initial response token back to the endpoint captive portal detection application in response to the initial HTTP ping request, the endpoint captive portal detection application sending an initial HTTPS query request and the initial response token to the Internet accessible web server, the initial HTTPS query request requiring client/server mutual authentication;

determining if the required client/server mutual authentication is successful;

if the required client/server mutual authentication is not successful, transforming a status of the end user computing system to the status of assumed "in" captive portal; and if the required client/server mutual authentication is successful, transforming a status of the end user computing system to the status of assumed "out" of captive portal.

16. The method for detecting captive portals of claim 15, further comprising:

after transforming a status of the end user computing system to either the status of assumed "out" of captive portal or the status of assumed "in" captive portal:

the endpoint captive portal detection application periodically sending follow up HTTP ping requests to the Internet accessible web server; and if the Internet accessible web server sends a response token back to the endpoint captive portal detection application in response to a follow up HTTP ping request that is unchanged, maintaining the status of the end user computing system as either the status of assumed "out" of captive portal or the status of assumed "in" captive portal without sending an additional HTTPS query request.

17. The method for detecting captive portals of claim 15, further comprising:

after transforming a status of the end user computing system to either the status of assumed "out" of captive portal or the status of assumed "in" captive portal:

the endpoint captive portal detection application periodically sending follow up HTTP ping requests to the Internet accessible web server; and if the Internet accessible web server sends a response token back to the endpoint captive portal detection application in response to a follow up HTTP ping request that is changed:

the endpoint captive portal detection application sending a new HTTPS query request to the Internet accessible web server, the new HTTPS query request requiring client/server mutual authentication;

determining if the required client/server mutual authentication is successful;

if the required client/server mutual authentication is not successful, transforming a status of the end user computing system to the status of assumed "in" captive portal; and if the required client/server mutual authentication is successful, transforming a status of the end user computing system to the status of assumed "out" of captive portal.

18. The method for detecting captive portals of claim 15, wherein:

if the required client/server mutual authentication is successful, and a status of the end user computing system is transformed to the status of assumed "out" of captive portal, sending the request for the desired webpage to a proxy server system and a cloud.

19. The method for detecting captive portals of claim 18, wherein:

the cloud is a private cloud.

20. The method for detecting captive portals of claim 18, wherein:

the cloud is a security cloud.

* * * * *